United States Patent [19]
Hellgren et al.

[11] Patent Number: 6,023,579
[45] Date of Patent: Feb. 8, 2000

[54] COMPUTER-IMPLEMENTED METHOD FOR GENERATING DISTRIBUTED OBJECT INTERFACES FROM METADATA

[75] Inventors: Lars Viktor Hellgren, Newport Beach; David Earl Keen, Laguna Niguel, both of Calif.

[73] Assignee: Unisys Corp., Blue Bell, Pa.

[21] Appl. No.: 09/061,583

[22] Filed: Apr. 16, 1998

[51] Int. Cl.[7] .................................................. G06F 9/44
[52] U.S. Cl. .......................... 395/702; 395/701; 707/103; 709/302; 709/303
[58] Field of Search ................................... 395/701–703, 395/705; 709/300–305; 707/100–104

[56] References Cited

U.S. PATENT DOCUMENTS

| | | | |
|---|---|---|---|
| 5,517,645 | 5/1996 | Stutz et al. | 709/300 |
| 5,581,755 | 12/1996 | Koerber et al. | 707/103 |
| 5,644,764 | 7/1997 | Johnson et al. | 707/103 |
| 5,848,273 | 12/1998 | Fontana et al. | 395/701 |
| 5,860,072 | 1/1999 | Schofield | 707/101 |

*Primary Examiner*—James P. Trammell
*Assistant Examiner*—Kakali Chaki
*Attorney, Agent, or Firm*—J. Ronald Richebourg; Mark T. Starr; Steven B. Samuels

[57] ABSTRACT

A method and system for creating a distributed object interface description and a distributed object server interface module to a software system, such as a repository. In a preferred embodiment, a repository contains an object oriented information model from which an interface description and a server implementation interface module can be generated. A metadata interface allows a generator program to obtain detailed information about the information model. The generator program uses the metadata to create the interface description for the model. The generator program also generates implementation classes that will serve as the interface module between the distributed object interface and the repository.

7 Claims, 10 Drawing Sheets

COMPUTER-IMPLEMENTED METHOD FOR GENERATING DISTRIBUTED OBJECT INTERFACES FROM METADATA

FIELD OF THE INVENTION

The present invention relates generally to a computer implemented method and in particular to a method for creating a distributed object interface to a repository.

BACKGROUND OF THE INVENTION

Classes and objects are general concepts in computer object technology. A class describes behavior and content of an object. An object is referred to as the instantiation of a class. Classes are also called types.

An object is a piece of intelligence that encapsulates code and data. In contrast, a distributed object is a piece of intelligence that can live anywhere on a network. Distributed objects are packaged as independent pieces of code that can be accessed by remote clients via method invocations. Distributed objects are independent software components, which are smart pieces of software that can operate in different networks, operating systems and tool palettes. A component is an object that is not bound to a particular program, computer language or implementation. Objects are the optimal building blocks for creating the next generation of distributed systems.

A repository is a software system for storing, managing, sharing, and reusing classes and objects. In a repository, classes are used to describe information models. Models are abstractions of real-world concepts such as ideas, objects, or systems. Repository information models define information stored in repositories and identify repository functionality.

Classes define types for the repository information model and provide a common structure for information in a repository. A type describes a set of features—the state and behavior—that an object or another type can possess. A type defines a pattern that can be used to create or identify objects. A model is defined by a hierarchy of types. A type that is derived from one or more other types is called a subtype. The definition of a type identifies the type or types from which it is derived. A type from which a subtype is derived is called a supertype. A subtype inherits all the features of its supertype, and can be customized by adding new features and by overriding features in its supertypes.

Features fall into two categories: properties and operations. Properties define state and operations define behavior. Properties are further divided into attributes, whose values are embedded within the owning objects, and references, whose values are independent objects.

An object is an instance of a type. An object of a specified type can be cast to one of its supertypes (up cast or widened) or one of its subtypes (down cast or narrowed). After a successful cast, the properties and features of the type to which the cast was made are in effect for the object.

Metadata provides the mechanisms for discovery and modification of repository models. Metadata also describes the characteristics and internal relationships of these types and features. A metamodel embodies the collective metadata description of a repository information model. Similarly, a metaclass is the metadata description of a class, a metafeature is the metadata description of a feature, etc. Using a metadata interface, a program can determine all of the types and features in a model.

A repository is accessed through an object interface; and, through this interface, a program can create new objects, obtain references to existing objects, and invoke operations on objects. A distributed object interface provides a program with access to the repository over a computer communications network.

In order to operate on an object a program must have an object reference to that object. The instantiation of a class for a program produces an object reference. If the object lives within the process of the program wanting to perform an operation on the object, the object reference may simply be an address in the address space of that process. If the object is distributed, however, a distributed object reference that can reference objects existing in different processes in different computers is needed. An object factory is a module (typically a distributed object) which contains operations that return distributed object references when invoked.

An object interface is defined using an interface definition language. Whether the objects are distributed or not, this language specifies the interface as presented by the objects to the world, without defining the inner workings of the objects. The interface definition of a repository information model is all the knowledge that a program will need in order to access the information model in a repository. In a preferred embodiment special compilers will generate language specific object interfaces directly from the interface definition language.

An object request broker ("ORB") manages and performs the actual message transportation between a program client and a server repository. Given the proper implementation of the client to object request broker interface and object request broker to repository interface, the client needs no knowledge whatsoever as to where the repository objects are located; the repository or repositories could be located on the local computer or on one or more remote computers.

CORBA, or Common Object Request Broker Architecture, is a specification established by the Object Management Group ("OMG"), that provides the standard interface definition between OMG-compliant objects. CORBA is more than an Object Request Broker. It is a complete distributed object platform. An ORB allows clients to invoke methods on remote objects, whereas CORBA extends the reach of applications across networks, languages, component boundaries and operating systems. CORBA was designed to allow intelligent components to discover each other and interoperate. However, CORBA goes beyond just interoperability. It also specifies an extensive set of services for creating and deleting objects, accessing them by name, storing them in persistent stores, externalizing their states and defining ad hoc relationships between them.

For more detailed information on CORBA and distributed objects, reference is made to a textbook entitled "The Essential Distributed Objects, Survival Guide" by Robert Orfali, Dan Harkey, and Jeri Edwards, published in 1996, by John Wiley & Sons, Inc.

SUMMARY OF THE INVENTION

Accordingly, it is an object of the present invention to provide a method and system that overcomes the problems of the prior art by automatic generation of interface definition language and server implementation code for distributed access to objects in a repository.

Another object of the present invention is to provide a method and system that is not limited to any single problem domain.

Yet another object of the present invention is to provide a method and system that can generate complete interfaces for distributed access to any repository information model.

Still another object of the present invention is to provide a method and system that is not limited to any particular client programming language.

Another object of the present invention is to provide a method and system that can overcome discrepancies between interface definition language and repository interface by special mapping of interface definition language constructs to repository interface constructs.

Yet another object of the present invention is to provide a method and system that is capable of converting distributed object references to repository object references.

Still another object of the present invention is to provide a method and system that can convert repository object references to distributed object references These and other objects, which will become apparent as the invention is described in detail below, are provided by a method and system for automatic generation of interface definition language and server interface modules for distributed access to repository objects. In a preferred embodiment, a generator program uses metadata to first obtain information about the repository information model. Based upon this information, the generator then creates the interface definition language description and the server interface module.

DETAILED DESCRIPTION OF ONE EMBODIMENT

Figure 1:
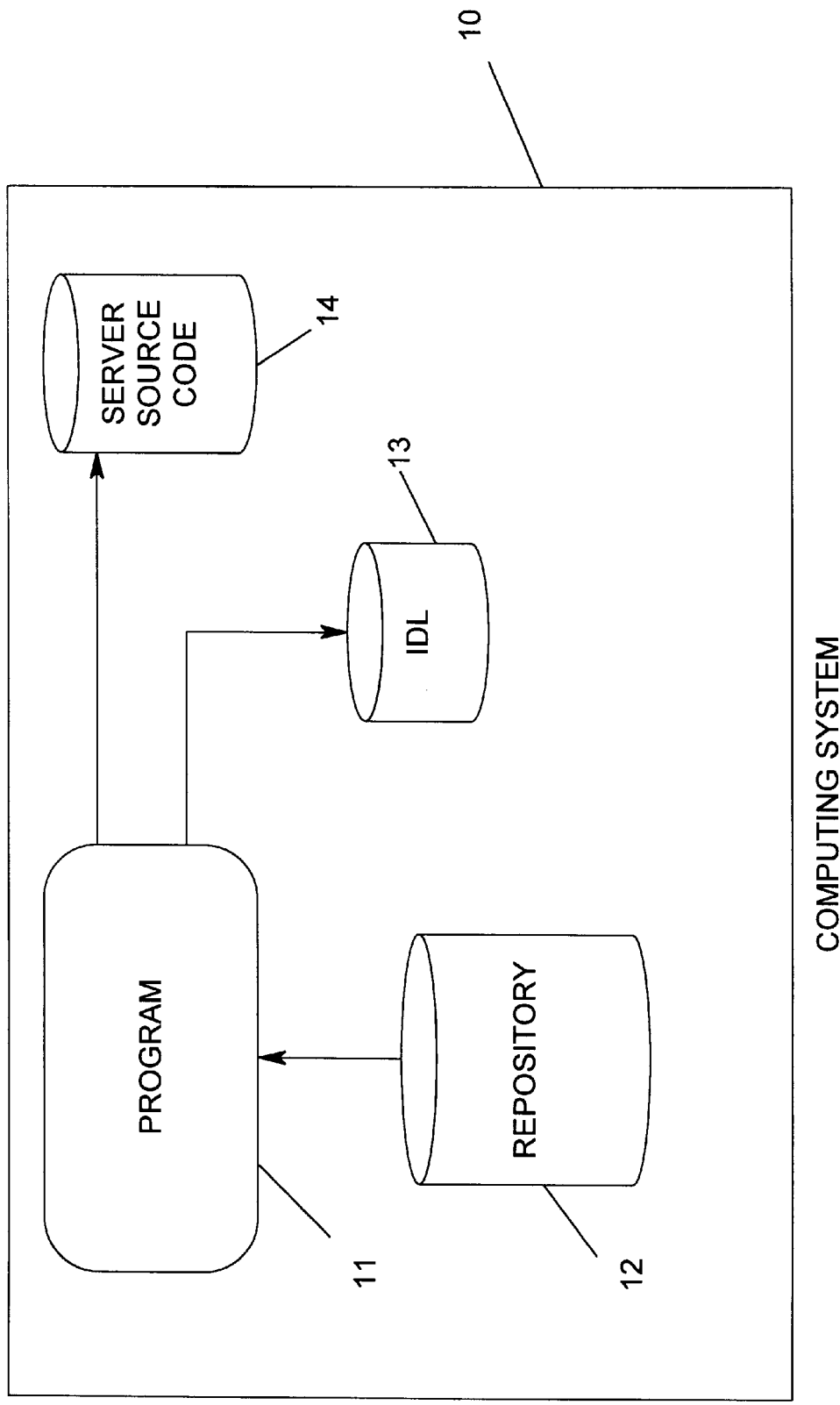
FIG. 1 is a block diagram of a computer system which is capable of executing the method of the present invention.

Object-oriented programming is defined as a method of implementation in which programs are organized as cooperative collections of objects, each of which represents an instance of some type. See a text entitled *Object-Oriented Analysis and Design*, by Grady Booch, 1994.

An object is an abstract representation of a real-world concept or thing—such as a person, a software package, or an event. In a computer system memory, the state of an object is represented by the values of instance variables defined for the object's type. For example, the state of a person object might be a name, birth date, spouse, etc.

The behavior of an object is the set of operations that the object can perform. In the computer system, the behavior of an object is represented by the operations defined for the object's type.

Objects in the memory of a computer system represent real-world or conceptual entities. An object occupies a portion of memory which contains named instance variables for storing information about the entity. An object also provides operations that can be performed by the computer processor for accessing and modifying the information.

Types

A type describes the instance variables and operations that an object possesses. A type defines a pattern that can be used to create or identify objects; it does not contain the actual object. A type can also be a base for other types.

Objects described by a type are called instances of that type. Types derived from a base type are called subtypes of that type. A type that is used to define only characteristics of other types and not objects is said to be abstract.

The definition of a subtype identifies the base types from which it is derived. A type cannot be a subtype of itself. A subtype inherits all the instance variables and operations of its base types. It can be customized by adding new instance variables and operations. For example, a type called Manager defined as a subtype of Employee would inherit all the instance variables and operations of Employee and would define additional instance variables and operations of its own. An object of type Manager would then have all the instance variables defined by the Employee and Manager types, and would have all the operations defined by both types.

Instance Variables

The memory used by an object contains instance variables. Each instance variable has a type, which defines the range of values that can be stored in the variable.

Operations

An operation is a feature that represents a behavior that objects possess. The operations defined for a type form an interface that can be seen by users of objects of that type. An operation can have parameters that identify information a caller must provide when invoking the operation. If an operation has no parameters, a caller merely invokes the operation for the desired object.

Methods

Each operation must be implemented by a module of code called a method. A method is the steps performed to complete an operation.

The method of the present invention generates IDL and a repository interface module for each information model in the repository. Using the metadata interface, the method determines the type hierarchy of the model and identifies all the types and their features. The method then creates an IDL file and a number of files for implementing the repository interface module. The method also creates command files for compiling and linking the distributed object interface.

Referring now to FIG. 1, a block diagram illustrates a typical computer system 10 for executing the method of the present invention, which is embodied in a generator program 11 that interrogates a repository 12 and generates an IDL file 13 and server source code 14.

Figure 2:
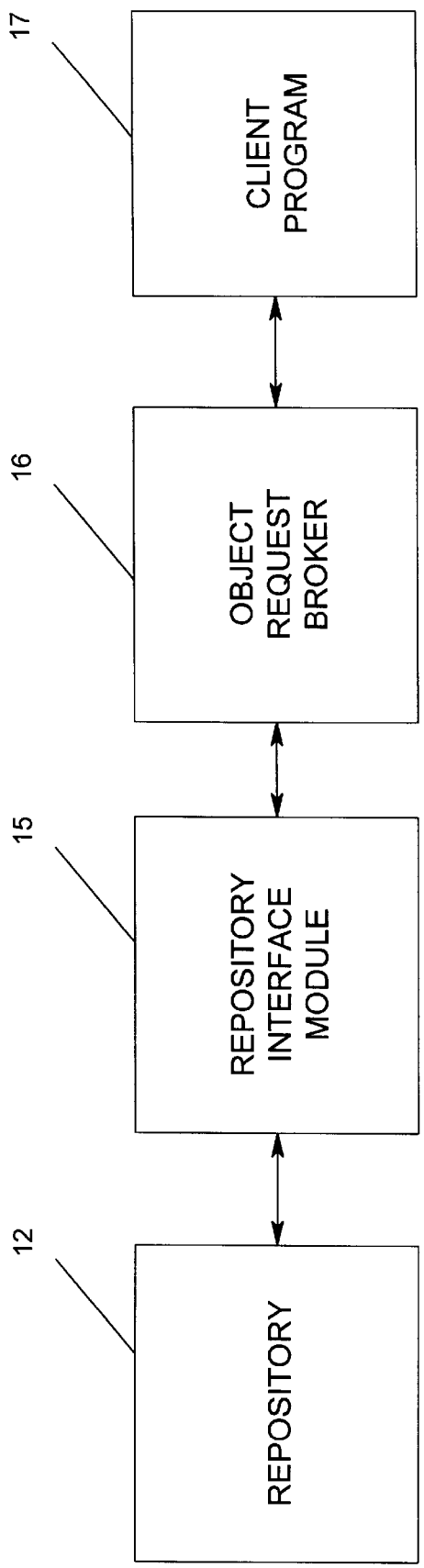
FIG. 2 is a module diagram showing the relationship of the repository interface module to the repository and an Object Request Broker.

FIG. 2 shows a repository interface module 15 disposed between the repository 12 and an ORB (object request broker) 16. A client program 17 is coupled to the ORB 16. The method of the present invention generates code to build the repository interface module 15 and code for the interfaces between the module 15 and the ORB 16; and, between the ORB 16 and the client program 17.

Figure 3A:
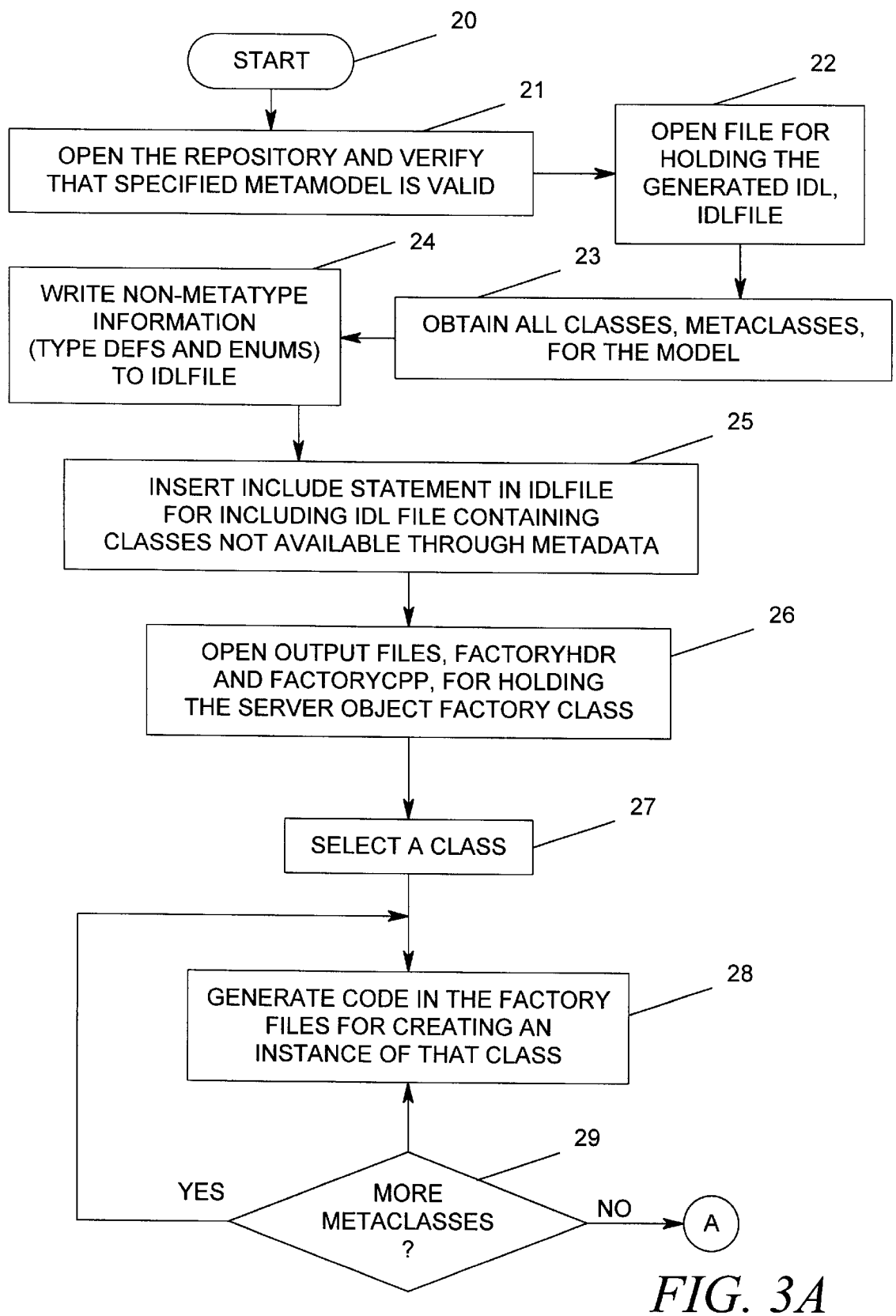
FIGS. 3A through 3C combined form a flow chart of the method for generating code for the distributed object interface.

Referring now to FIG. 3A, the first of a three-sheet drawing illustrates the method of the present invention in a flow chart. The process begins with a start bubble 20 followed by a step of opening the repository 12 and verifying that a specified MetaModel is valid (block 21). Next, a file is opened for holding a generated Interface Definition Language ("IDL"), IDLFILE 14 (block 22). A list of all of the classes and MetaClasses for the model are obtained (block 23) followed by writing non-MetaType information (type definitions and enumerations not defined by metadata) to the IDLFILE 14 (block 24). Next, an include statement is inserted into the IDLFILE 14 for including an IDL file containing classes not available through metadata (block 25).

Output files, FactoryHDR and FactoryCPP, are opened, for holding the server object factory class (block 26). Next, a class is selected (block 27), and code is generated in the factory files for creating an instance of that class (block 28). A test is then made as to whether or not there are more MetaClasses (diamond 29). If the answer is yes, then a return is made back to the block 28 for processing the next MetaClass. On the other hand, if the answer is no, then a branch is made to a Generate_Meta_Class function process shown in FIG. 3B, as denoted by a connector A.

Figure 3B:
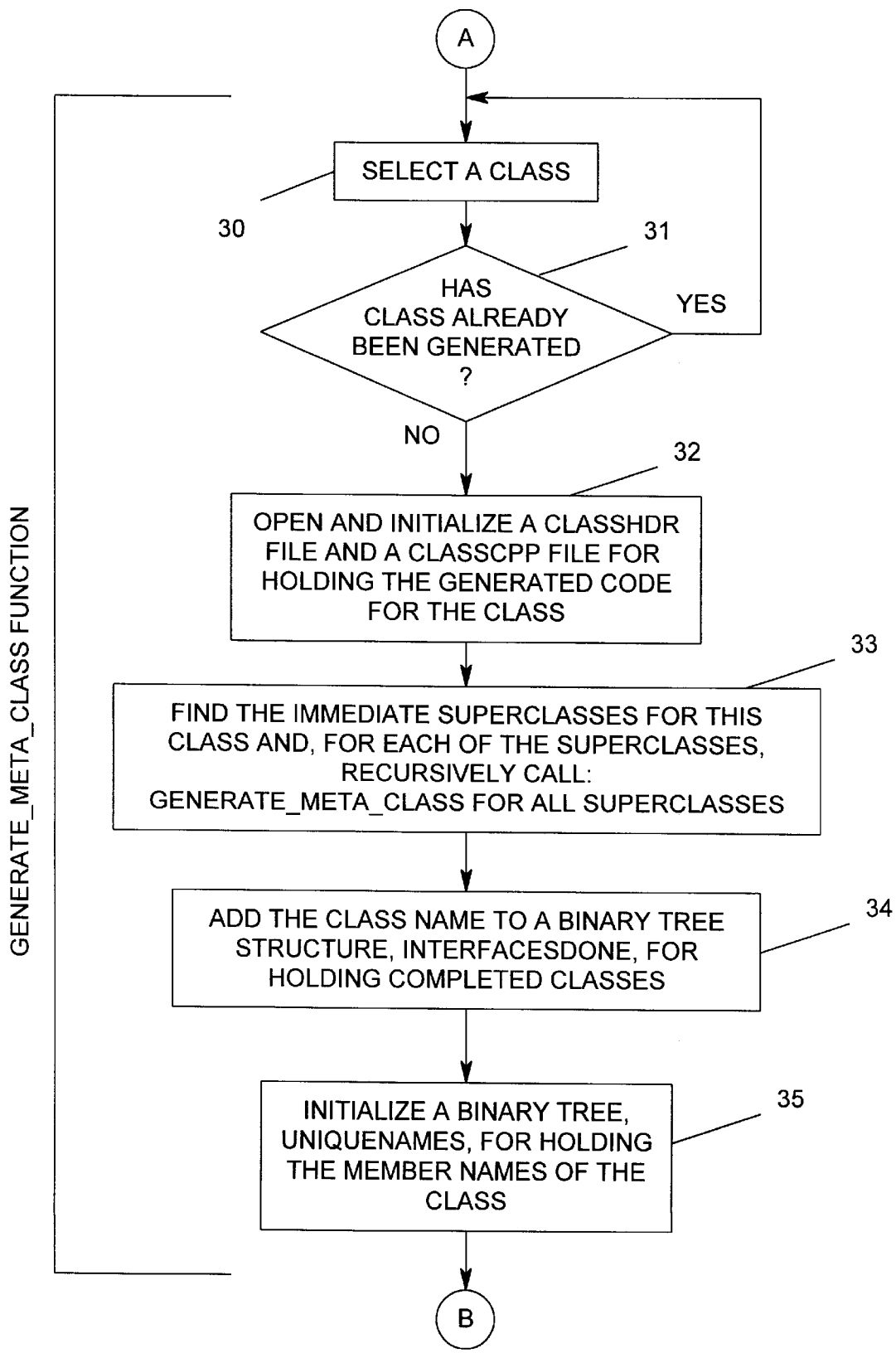

Referring now to FIG. 3B at the connector A, wherein a class is selected (block 30). Another test is made as to whether or not the class has already been generated (diamond 31). If the answer is yes, then a return is made back to select another class at the block 30. On the other hand, if the answer is no, then a classHDR file and a classCPP file are opened and initialized for holding the generated code for the class (block 32). Following this, a step of finding the immediate superclasses for this class and recursively call: Generate_Meta_Class for all superclasses (block 33). In other words, interface definitions for superclasses are generated before their subclasses regardless of the order of which the classes are obtained from the repository. This will enable proper compilation of the interfaces in the IDL file.

The class names are added to a sorted list structure, InterFacesDone, for holding completed classes (block 34). Next, a sorted list, UniqueNames, is initialized for holding the member names of the class (block 35). The process illustration continues in FIG. 3C as depicted by a connector B.

Figure 3C:
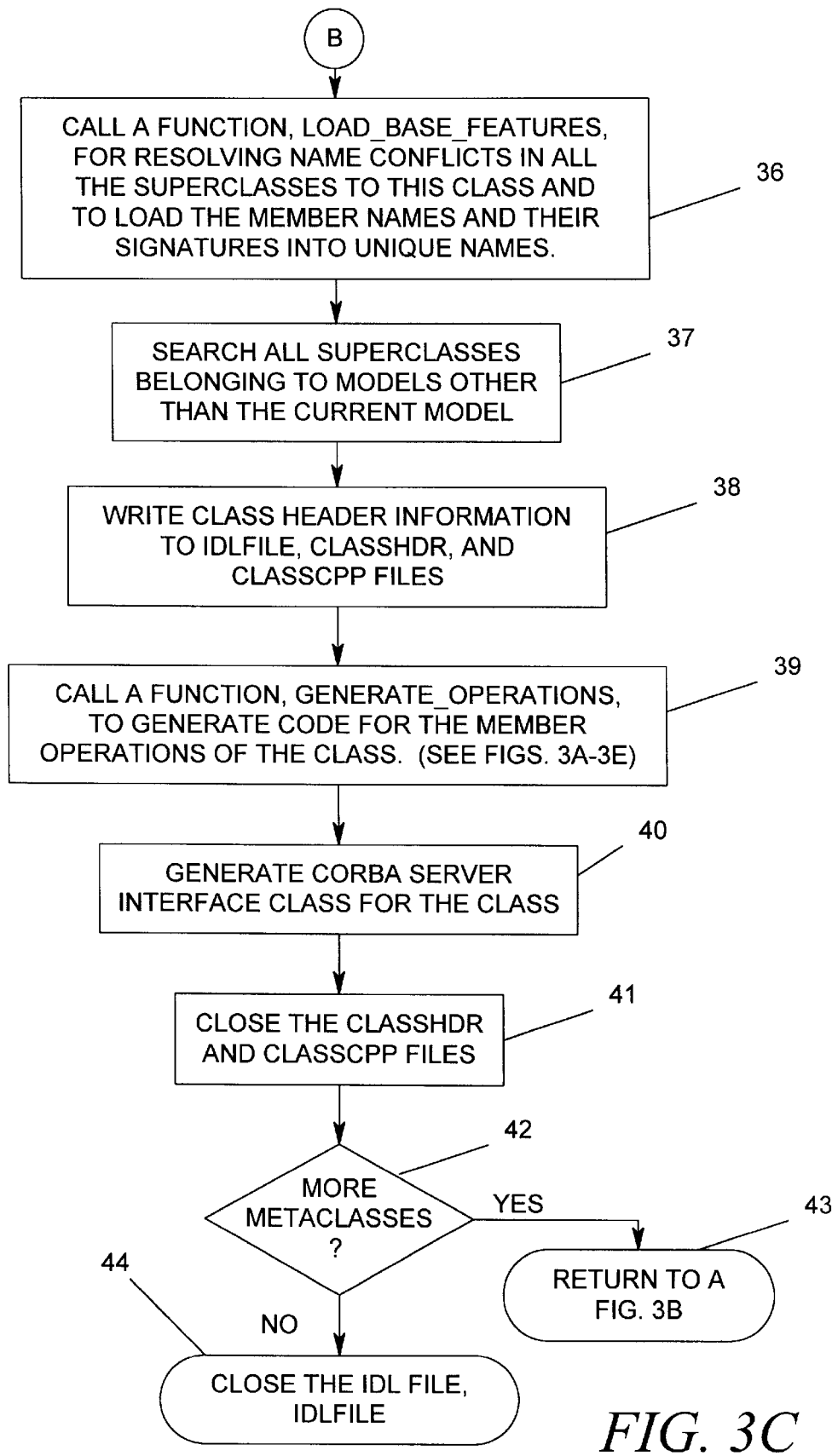

Referring now to FIG. 3C at the connector B, a function, Load_Base_Features, is called for resolving name conflicts in all the superclasses of this class and for loading the member names and their signatures into UniqueNames (block 36). Next, a search of all superclasses belonging to models other than the current model is performed (block 37). The generator, thus, can generate interfaces for models inheriting from other models. Class header information is written to IDLFILE 14, ClassHDR, and ClassCPP files (block 38). A function, Generate_Operations, is called to generate code for the member operations of the class (block 39). This operation will be amplified further hereinafter in conjunction with a description of FIGS. 3A through 3E.

Following the above, a CORBA server interface class is generated for the class (block 40). Next, the ClassHDR and ClassCPP files are closed (block 41). A test is then made as to whether or not there are more metaClasses (diamond 42). If there are more metaClasses, then a return is made back to the connector A in FIG. 2B for processing (bubble 43). On the other hand, if there are more metaClasses, then the IDL file, IDLFILE 16 is closed (bubble 44).

Figure 4A:
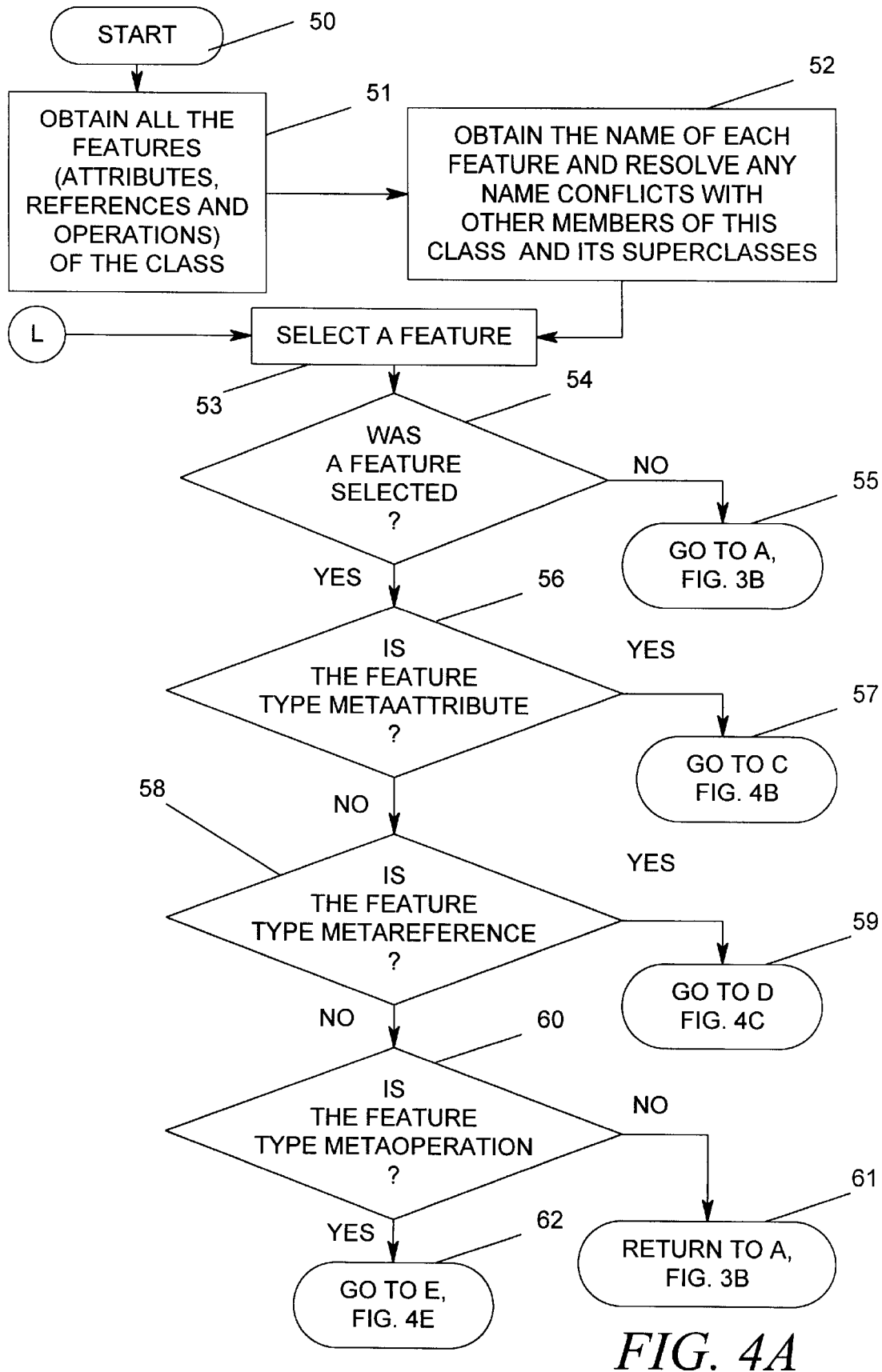
FIGS. 4A through 4E combined form an amplified flow chart of the method for generating code for member operations of the classes.

Referring now to FIG. 4A, a flow chart illustrates the process for generating code for the member operations of the class. The process begins with a start bubble 50 followed by a process step of obtaining all the features (i.e., attributes, references and operations) of the class (block 51). Next, the name of each feature is obtained and any name conflicts are resolved with other members of this class and its superclasses (block 52). Following this, a feature is selected (block 53).

A test is made as to whether or not a feature was selected (diamond 54), and if not a branch is made back to the select a class (block 30, FIG. 3B) at the connector A (bubble 55). On the other hand, if the answer to this test is yes, then another test is made as to whether or not the feature is type MetaAttribute (diamond 56). If the answer to this test is yes, then a branch is made forward (bubble 57) to a generate MetaAttribute process shown in FIG. 4B at a connector C, which will be explained shortly. On the other hand if the answer to the test in the diamond 56 is no, then yet another test is made as to whether or not the feature is a MetaReference (diamond 58). If the answer to this test is yes, then a branch is made forward (bubble 59) to connector D, FIG. 4C, which will be explained hereafter. On the other hand, if the answer to this test is no, then still another test is made as to whether or not the feature is type MetaOperation (diamond 60). If the answer to this test is no, then a return is made back to the connector A, FIG. 3B. On the other hand, if the answer to this test is yes, then a branch forward is made to a connector E, FIG. 4E, which will be explained hereafter.

Figure 4B:
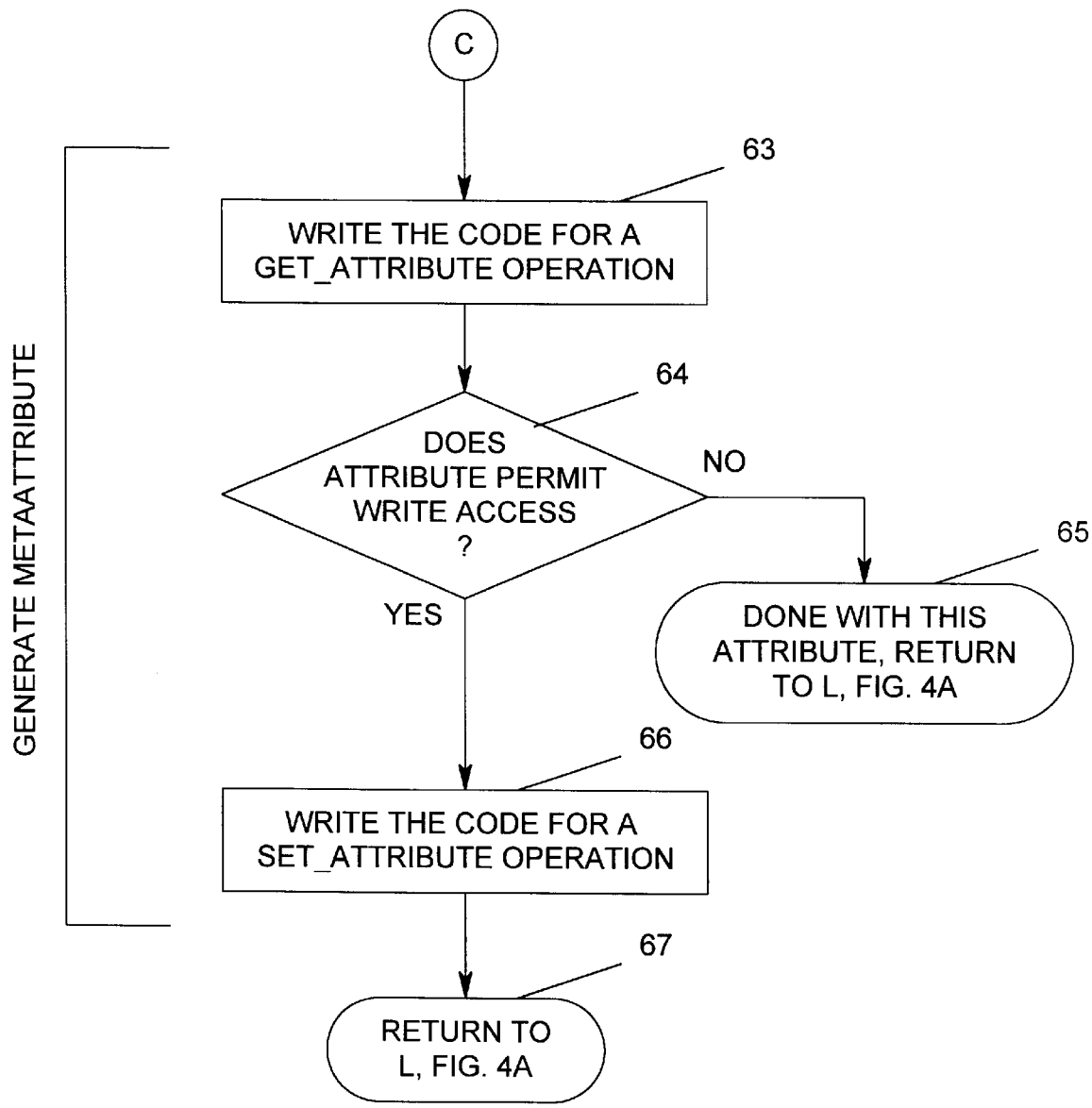

Referring now to FIG. 4B (which depicts a generate MetaAttribute process) at the connector C, the code for a Get_Attribute operation is written (block 63). Next, a test is made as to whether or not Attribute permits write access (diamond 64). If the answer to this test is no, then the process is done with this attribute and a return is made back to the process step 53 for selecting a next feature (connector L, FIG. 4A). On the other hand, if the answer to this test is yes, then the code for a Set_Attribute operation is written (block 66). After this a return is made back to the connector L for processing the next feature (bubble 67).

Figure 4C:
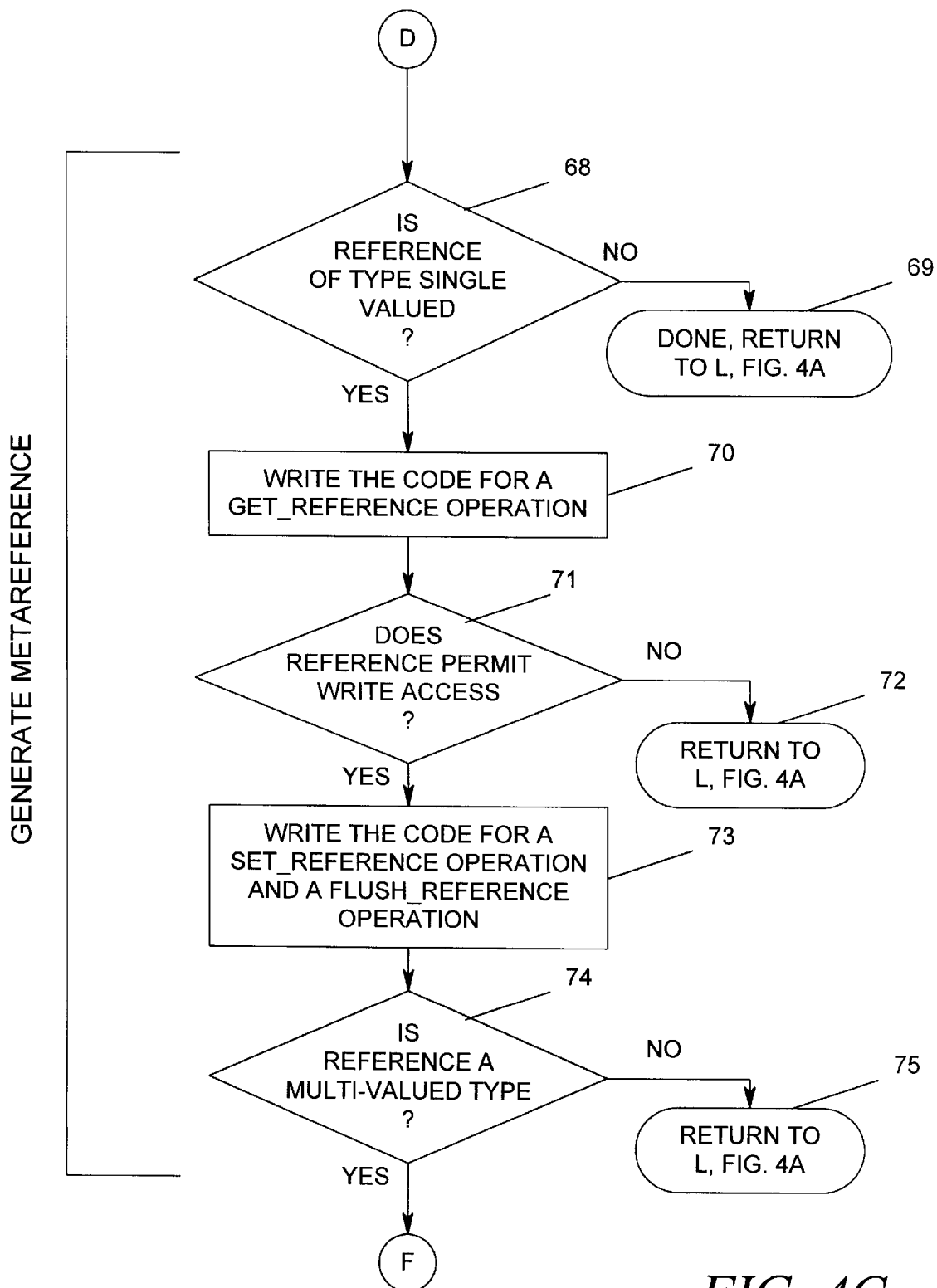

Referring now to FIG. 4C (which depicts a generate MetaReference process) at the connector D, a test is made as to whether or not reference is of type single valued (diamond 68). If the answer to this test is no, then the process is done and a return is made (bubble 69) back to select another feature (block 53 via connector L, FIG. 4A). On the other hand, if the answer to this test is yes, then the code for a Get_Reference operation is written (block 70). Next, another test is made as to whether or not Reference permits write access (diamond 71). If the answer to this test is no, then a return is made (bubble 72) back to select another feature (block 53 via connector L, FIG. 4A).

Following the above, the code for a Set_Reference operation and a Flush_Reference operation are written (block 73). Next, yet another test is made as to whether or not Reference is a multi-valued type (diamond 74). If the answer to this test is no, then a return is made (bubble 75) back to select another feature (block 53 via connector L, FIG. 4A). On the other hand, if the answer to this test is yes, then the process description is continued in FIG. 4D at a connector F.

Figure 4D:
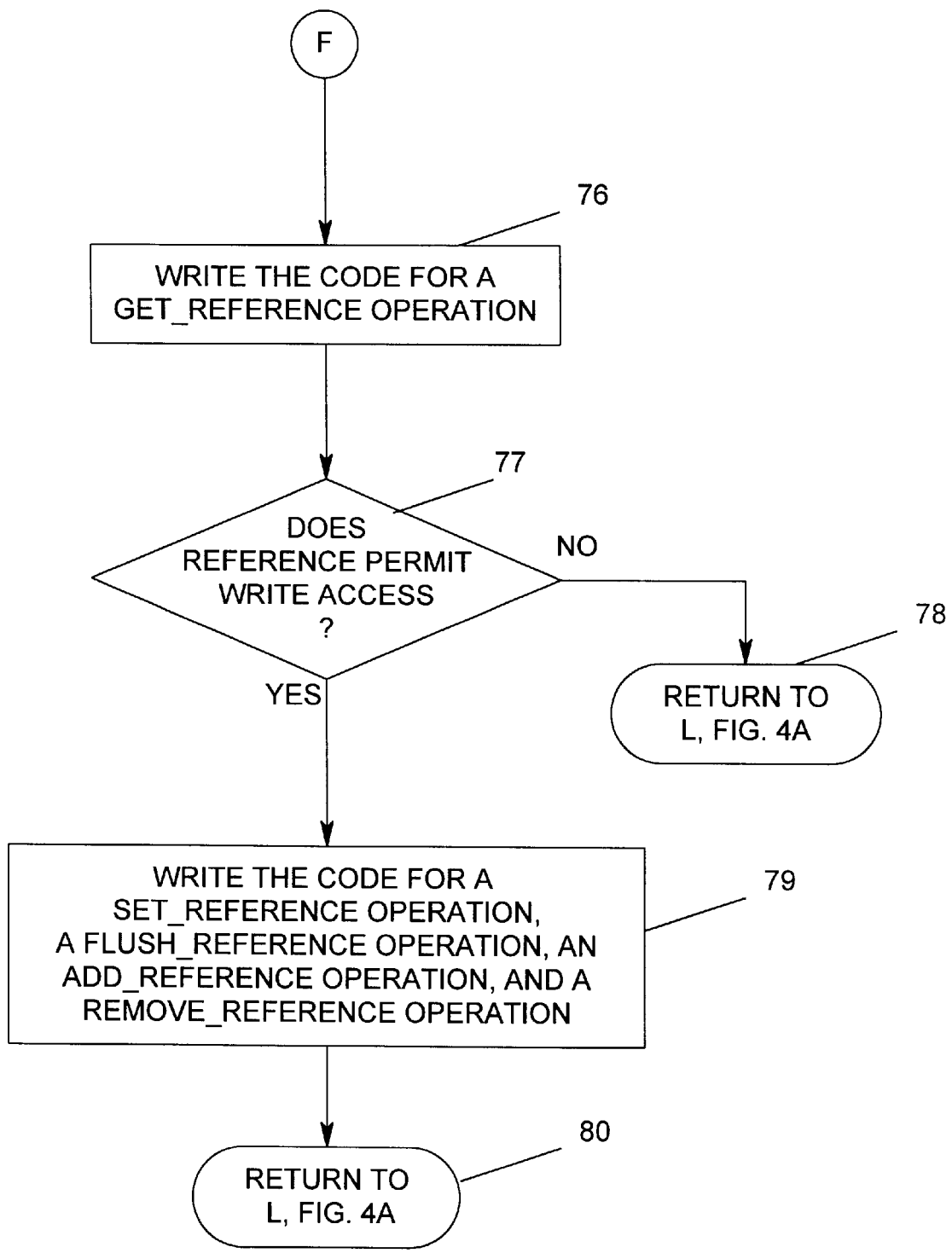

Referring now to FIG. 4D at the connector F, the code for a Get_Reference operation is written (block 76). Next, a test is made as to whether or not Reference permits write access (diamond 77). If the answer to this test is no, then a return is made (bubble 78) back to connector L, FIG. 4A, for another feature. On the other hand, if the answer to this test is yes, then the code for a Set_Reference operation, a Flush_Reference operation, an Add_reference operation and a Remove_Reference operation is written (block 79). Following this, a return is made to the connector L, FIG. 4A for the next feature (bubble 80).

Figure 4E:
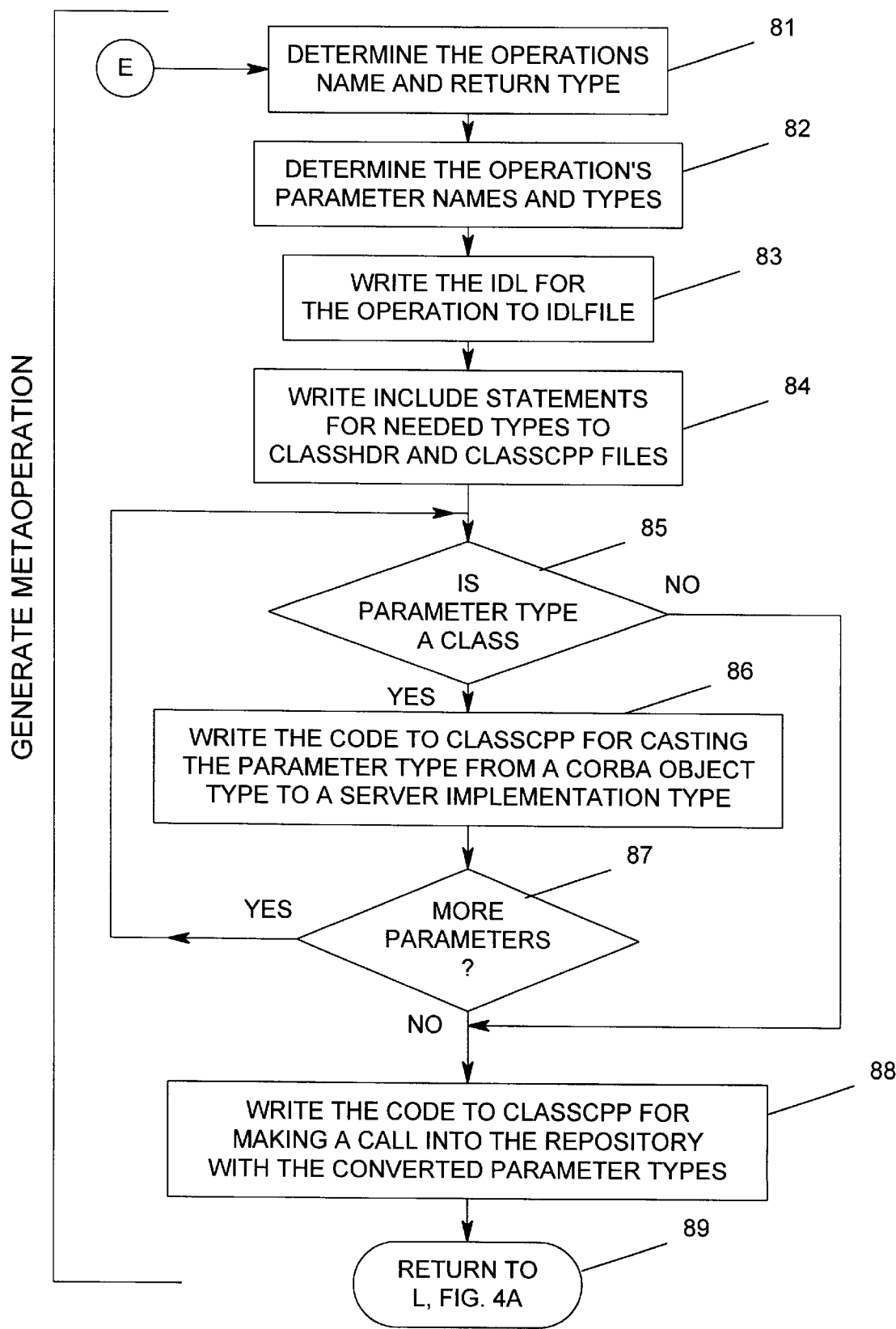

Referring now to FIG. 4E a generate MetaOperation is shown, which begins at the connector E. The operations name and return type are first determined (block 81). Next, the operation's parameter names and types are determined (block 82). Following this, the IDL for the operation is written to IDLFILE (block 83). Include statements for needed types to ClassHDR and ClassCPP files are written (block 84). A test is then made as to whether or not parameter type is a class reference (diamond 85). If the answer to this test is yes, then the code to ClassCPP for casting the parameter type from a CORBA object type to a server implementation type is written (block 86). Another test is made as to whether or not there are more parameters (diamond 87). If there are, then a return is made back to the diamond 85 for processing the next parameter.

On the other hand, if there are no more parameters, or if the answer to the test in the diamond 85 is no, then the code to ClassCPP for making a call into the repository with the converted parameter types is written (block 88). Following this step, a return is made (bubble 89) back to the connector L for selecting another feature (block 53, FIG. 4A).

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. A computer implemented method, using metadata of a repository, for automatic generation of COBRA interface definition language (IDL) descriptions of distributed object interfaces and implementation files to interface to said repository, said method comprising the steps of:
   a. obtaining all classes from metadata for a model stored in said repository;
   b. generating code in IDL and repository interface module interface files for creating an instance of that class in the repository interface module;
   c. generating code in order to inquire and alter values of data members of the corresponding repository object of said class including:
      1) selecting a class;
      2) opening and initializing files for holding generated code for said class;
      3) finding immediate superclasses for said class;
      4) adding class name to a container for holding completed classes;
      5) initializing a container for holding member names of said class; and,
   d. generating code for member operations of said class, thereby enabling distributed clients to invoke operations on corresponding repository objects.

2. The method in claim 1 wherein step d thereof further comprises the step of generating a class attribute interface in order to obtain and alter object attribute values.

3. The method as in claim 2 further comprising the steps of:
   e. writing code for a Get_Attribute operation;
   f. determining if said attribute permits a write operation, and if so;
   g. writing code for a Set_Attribute operation.

4. The method as in claim 1 wherein step d thereof further comprises the step of generating a class reference in order to access objects contained within a repository object.

5. The method as in claim 4 further comprising the steps of:
   e. writing code for a Get-reference operation;
   f. if said reference permits write access, writing code for a Set_Reference operation and a Flush_Reference operation in order to support existing functionality of said repository;
   g. if reference is a multi-valued type, writing code for a Get_Reference operation; and
   h. if reference permits write access, writing code for a Set_Reference operation, a Flush_Reference operation, and Add_Reference operation and a Remove-Reference operation, thereby supporting existing functionality for said repository.

6. The method as in claim 1 wherein step d thereof further comprises the step of generating an operation in order to invoke operations on objects in said repository.

7. The method in claim 6 further comprising the steps of:
   e. determining operation name and return type;
   f. determining operation's parameter names and types; and,
   g. writing include statements for needed types to include needed declarations from other, generated files.

* * * * *